(12) United States Patent
Wei et al.

(10) Patent No.: US 9,274,703 B2
(45) Date of Patent: Mar. 1, 2016

(54) METHOD FOR INPUTTING INSTRUCTION AND PORTABLE ELECTRONIC DEVICE AND COMPUTER READABLE RECORDING MEDIUM

(71) Applicant: Wistron Corporation, New Taipei (TW)

(72) Inventors: Shou-Te Wei, New Taipei (TW);
Chia-Te Chou, New Taipei (TW);
Chih-Hsuan Lee, New Taipei (TW);
Chung-Wei Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 220 days.

(21) Appl. No.: 13/902,989

(22) Filed: May 28, 2013

(65) Prior Publication Data

US 2014/0125607 A1 May 8, 2014

(30) Foreign Application Priority Data

Nov. 8, 2012 (TW) .............................. 101141670 A (51) Int. Cl.
*G06F 3/0488* (2013.01)
*G06F 17/30* (2006.01)

(52) U.S. Cl.
CPC ........ *G06F 3/04883* (2013.01); *G06F 3/04886* (2013.01); *G06F 17/3071* (2013.01); *G06F 17/30713* (2013.01)

(58) Field of Classification Search
CPC ... G06F 3/048; G06F 3/0481; G06F 3/04883; G06F 17/3071; G06F 17/30713; G06F 3/04886; G06F 3/04897
USPC .................................................. 345/156–184
See application file for complete search history.

(56) References Cited

U.S. PATENT DOCUMENTS

| | | | |
|---|---|---|---|
| 2009/0066653 A1 | 3/2009 | Wang | |
| 2010/0306693 A1 | 12/2010 | Brinda | |
| 2011/0157378 A1 | 6/2011 | Pien | |
| 2011/0242038 A1* | 10/2011 | Kakuta et al. | ................. 345/173 |

FOREIGN PATENT DOCUMENTS

| | | | |
|---|---|---|---|
| CN | 102257457 | | 11/2011 |
| TW | 200917105 | | 4/2009 |
| TW | 200917105 A | * | 4/2009 |
| TW | 201122919 | | 7/2011 |

OTHER PUBLICATIONS

"Office Action of Taiwan Counterpart Application", issued on Oct. 14, 2014, p. 1-p. 29, with English translation thereof.

* cited by examiner

*Primary Examiner* — Aneeta Yodichkas
*Assistant Examiner* — Saifeldin Elnafia
(74) *Attorney, Agent, or Firm* — Jianq Chyun IP Office (57) ABSTRACT

A method for inputting instruction, a portable electronic device and a computer readable recording medium are provided. The method includes detecting taps applied on a touch screen, and determining whether tap positions of the taps belongs to the same group. The method also includes dividing the tap positions of the taps to groups if the tap positions of the taps do not belong to the same group, generating group flags according to the groups, and sorting the group flags according to a tap order of the taps, so as to generate a group flag sequence. In addition, the method further includes generating an operating instruction according to the group flag sequence.

21 Claims, 7 Drawing Sheets

METHOD FOR INPUTTING INSTRUCTION AND PORTABLE ELECTRONIC DEVICE AND COMPUTER READABLE RECORDING MEDIUM

CROSS-REFERENCE TO RELATED APPLICATION

This application claims the priority benefit of Taiwan application serial no. 101141670, filed on Nov. 8, 2012. The entirety of the above-mentioned patent application is hereby incorporated by reference herein and made a part of this specification.

BACKGROUND

1. Field of the Invention

The invention is directed to a method for inputting instruction, portable electronic device and a computer readable recording medium.

2. Description of Related Art

With the development of technology, functions that can be performed on smart phones have become more and more. Generally, if a user wants to issue an operating instruction to a smart phone, the user typically views icons or texts displayed on a touch screen of the smart phone so as to control the smart phone to perform a corresponding function module by way of the displayed symbols or texts. For instance, the user may control the smart phone to unlock the touch screen by dragging an unlock icon displayed on the touch screen. In other words, the user of the smart phone always has to look at the touch screen for effectively operating the smart phone, which results in inconvenience of using the smart phone.

Specifically, for the user of the smart phone, who is often too busy to distract to view the smart phone, relying on the icons or texts displayed on the touch screen to issue the operating instructions is quite inapplicable.

SUMMARY

Accordingly, a method for inputting instruction, a portable electronic device and a computer readable recording medium are provided, which are capable of effectively improving the convenience for inputting an operating instruction.

The invention is directed to a method for inputting instruction applicable to a portable electronic device having a touch screen. The method for inputting instruction includes detecting a plurality of taps applied on the touch screen and determining whether a plurality of tap positions corresponding to the taps belongs to the same group. When the tap positions corresponding to the taps do not belong to the same group, the method for inputting instruction also includes dividing the tap positions corresponding to the taps to a plurality of groups, generating a plurality of group flags according to the groups and sorting the group flags according to a tap order of the taps so as to generate a group flag sequence. Besides, the method for inputting instruction further includes generating an operating instruction according to the group flag sequence.

In an embodiment of the invention, the method for inputting instruction further includes generating the group flag sequence according to a predetermined rule when the tap positions corresponding to the taps belong to the same group.

In an embodiment of the invention, the step of determining whether the tap positions corresponding to the taps belong to the same group includes calculating a dispersion degree of the tap positions and determining whether the dispersion degree is greater than a dispersion threshold. When the dispersion degree is not greater than the dispersion threshold, the tap positions are identified as belonging to the same group, and when the dispersion degree is greater than the dispersion threshold, the tap positions are identified as not belonging to the same group.

In an embodiment of the invention, the step of dividing the tap positions corresponding to the taps to the groups includes dividing the tap positions corresponding to the taps to the groups by using a K-means clustering algorithm.

In an embodiment of the invention, the step of determining whether the tap positions corresponding to the taps belong to the same group includes calculating a distance between each of the tap positions and determining whether the distance between each of the tap positions is smaller than a distance threshold. When the distance between each of the tap positions is smaller than the distance threshold, the tap positions are identified as belonging to the same group, and when the distance between each of the tap positions is not smaller than the distance threshold, the tap positions are identified as not belonging to the same group.

In an embodiment of the invention, the step of dividing the tap positions corresponding to the taps to the groups includes calculating an average distance of the tap positions and dividing the tap positions to the groups according to the average distance and the distance between each of the tap positions.

In an embodiment of the invention, the method for inputting instruction further includes performing a predetermined function module according to the operating instruction.

In an embodiment of the invention, the method for inputting instruction further includes dividing the touch screen to a plurality of tap regions by using at least one virtual line and corresponding each of the tap regions to one of the groups.

The invention is further directed to a portable electronic device including a touch screen, a storage unit and a processing unit. The touch screen is configured to detect a plurality of taps. The storage unit is configured to store a plurality of tap positions corresponding to the taps and a tap order of the taps. The processing unit is coupled to the touch screen and the storage unit and configured to determine whether the tap positions corresponding to the taps belong to the same group. When the tap positions corresponding to the taps do not belong to the same group, the processing unit is configured to divide the tap positions corresponding to the taps to a plurality of groups, generate a plurality of group flags according to the groups, and sort the group flags according to a tap order of the taps so as to generate a group flag sequence, wherein the processing unit is configured to generate an operating instruction according to the group flag sequence.

In an embodiment of the invention, when the tap positions corresponding to the taps belong to the same group, the processing unit is configured to generate the group flag sequence according to a predetermined rule.

In an embodiment of the invention, the processing unit is configured to calculate a dispersion degree of the tap positions and determine whether the dispersion degree is greater than a dispersion threshold. When the dispersion degree is not greater than the dispersion threshold, the processing unit is configured to identify the tap positions as belonging to the same group, and when the dispersion degree is greater than the dispersion threshold, the processing unit is configured to identify the tap positions as not belonging to the same group.

In an embodiment of the invention, the processing unit is configured to divide the tap positions corresponding to the taps to the groups by using a K-means clustering algorithm.

In an embodiment of the invention, the processing unit configured to calculate a distance between each of the tap positions and determine whether the distance between each of the tap positions is smaller than a distance threshold. When the distance between each of the tap positions is smaller than the distance threshold, the processing unit is configured to identify the tap positions as belonging to the same group, and when the distance between each of the tap positions is not smaller than the distance threshold, the processing unit is configured to identify the tap positions as not belonging to the same group.

In an embodiment of the invention, the processing unit is further configured to calculate an average distance of the tap positions and divide the tap positions to the groups according to the average distance and the distance between each of the tap positions.

In an embodiment of the invention, the processing unit is further configured to perform a predetermined function module according to the operating instruction.

In an embodiment of the invention, the processing unit is configured to divide the touch screen to a plurality of tap regions by using at least one virtual line and correspond each of the tap regions to one of the groups.

The invention is further directed to a computer readable recording medium storing a plurality of program codes. After the program codes are loaded into the micro-processor unit, the micro-processor unit is configured to execute the program codes to complete the following steps. A plurality of taps applied on a touch screen is detected. Whether a plurality of tap positions corresponding to the taps belongs to the same group is determined. When the tap positions corresponding to the taps do not belong to the same group, the tap positions corresponding to the taps is divided to a plurality of groups, a plurality of group flags is generated according to the groups, and the group flags are sorted according to a tap order of the taps so as to generate a group flag sequence. And, an operating instruction is generated according to the group flag sequence.

In an embodiment of the invention, the micro-processor unit is further configured to execute the program codes to complete the following step. When the tap positions corresponding to the taps belong to the same group, the group flag sequence is generated according to a predetermined rule.

In an embodiment of the invention, the micro-processor unit is further configured to execute the program codes to complete the following steps. A dispersion degree of the tap positions is calculated and whether the dispersion degree is greater than a dispersion threshold is determined When the dispersion degree is not greater than the dispersion threshold, the tap positions are identified as belonging to the same group, and when the dispersion degree is greater than the dispersion threshold, the tap positions are identified as not belonging to the same group.

In an embodiment of the invention, the micro-processor unit is further configured to execute the program codes to complete the following step. The tap positions corresponding to the taps are divided to the groups by using a K-means clustering algorithm.

In an embodiment of the invention, the micro-processor unit is further configured to execute the program codes to complete the following steps. A distance between each of the tap positions is calculated, and whether the distance between each of the tap positions is smaller than a distance threshold. When the distance between each of the tap positions is smaller than the distance threshold, the tap positions are identified as belonging to the same group, and when the distance between each of the tap positions is not smaller than the distance threshold, the tap positions are identified as not belonging to the same group.

In an embodiment of the invention, the micro-processor unit is further configured to execute the program codes to complete the following steps. An average distance of the tap positions is calculated and the tap positions are divided to the groups according to the average distance and the distance between each of the tap positions.

In an embodiment of the invention, the micro-processor unit is further configured to execute the program codes to complete the following step. A predetermined function module is performed according to the operating instruction.

In an embodiment of the invention, the micro-processor unit is further configured to execute the program codes to complete the following steps. The touch screen is divided to a plurality of tap regions by using at least one virtual line, and each of the tap regions is corresponded to one of the groups.

To sum up, the embodiments of the invention provide a method for inputting instruction, a portable electronic device and a computer readable recording medium, in which a plurality of taps applied on a touch screen is detected, a clustering operation is performed on a plurality of tap positions corresponding to a plurality of taps, and a plurality of group flags is generated according to an operation result of the clustering result. Afterward, the group flags are sorted according to a tap order of the taps so as to generate a group flag sequence, and an operating instruction is generated according to the group flag sequence. In addition, a touch screen may also be divided to a plurality of tap regions by one or more virtual lines such that the group flag sequence is generated according to each tap region corresponding to one of the taps and the tap order of the taps, and operating instruction is generated according to the group flag sequence. Accordingly, a user may input an instruction to the portable electronic device according to a distribution of the tap positions, without checking the touch screen of the portable electronic device so as to improve the convenience of inputting the operating instruction to the portable electronic device.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A~FIG. 3C are schematic diagrams of generating a group flag sequence according to the first exemplary embodiment of the invention.

DESCRIPTION OF EMBODIMENTS

According to an embodiment of the invention, a method for inputting instruction is provided, by which a group flag sequence is generated according to a plurality of tap positions applied on a touch screen by a user and a tap order thereof so that an operating instruction is generated according to the group flag sequence. Thereby, the convenience of operating a portable electronic device can be improved. Additionally, according to another embodiment of the invention, a portable electronic device and a computer readable recording medium applicable to implementing the method for inputting instruction are introduced. In order to make the content of the present invention clearer, the following embodiments are illustrated as examples that can be truly implemented by the present invention.

[First Exemplary Embodiment]

Figure 1:
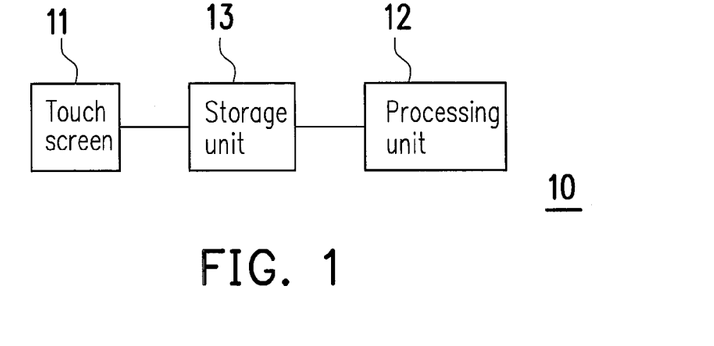
FIG. 1 is a block diagram illustrating a portable electronic device according to a first exemplary embodiment of the invention.

FIG. 1 is a block diagram illustrating a portable electronic device according to a first exemplary embodiment of the invention.

Referring to FIG. 1, a portable electronic device 10 includes a touch screen 11, a storage unit 12 and a processing unit 13.

For instance, the portable electronic device 10 may be any type of portable electronic device, such as a mobile phone, a personal digital assistant (PDA), a smart phone, an electronic book (e-book), a game console, or a tablet PC.

The touch screen 11 is an input and output (I/O) interface of the portable electronic device 10 and configured to display various types of operation screens of the portable electronic device 10. Specially, the touch screen 11 may detect various types of touch operations of a user. For example, the touch operations include taps or drags. In the present exemplary embodiment, the touch screen 11 may be a resistive touch panel, a capacitive touch panel, an optical touch panel, an acoustic wave touch panel, an electromagnetic touch panel, and the invention is not intent to limit the type of the touch screen.

The storage unit 12 is configured to store data. In implementation, the storage unit 12 may be built in the portable electronic device 10 or connected with the portable electronic device 10 from the external via a specific interface. In the present exemplary embodiment, the storage unit 12 may be a storage medium, such as a memory, a hard disk, a compact disk (CD) or an external storage device (e.g. a memory card or a flash memory) or a combination thereof.

The processing unit 13 is coupled to the touch screen 11 and the storage unit 12. The processing unit 13 may generate an operating instruction according to a plurality of successive taps which is detected by the touch screen 11. Besides, the processing unit 13 may execute a corresponding predetermined function module according to the generated operating instruction. For instance, the predetermined function module includes a screen unlock module, a call module, a message module or a camera module, but the invention is not limited thereto. In the present exemplary embodiment, the processing unit 13 may be a micro-processor, an embedded processor or a central processing unit (CPU), but the invention is not limited to being implemented by the aforementioned manners.

Figure 2:
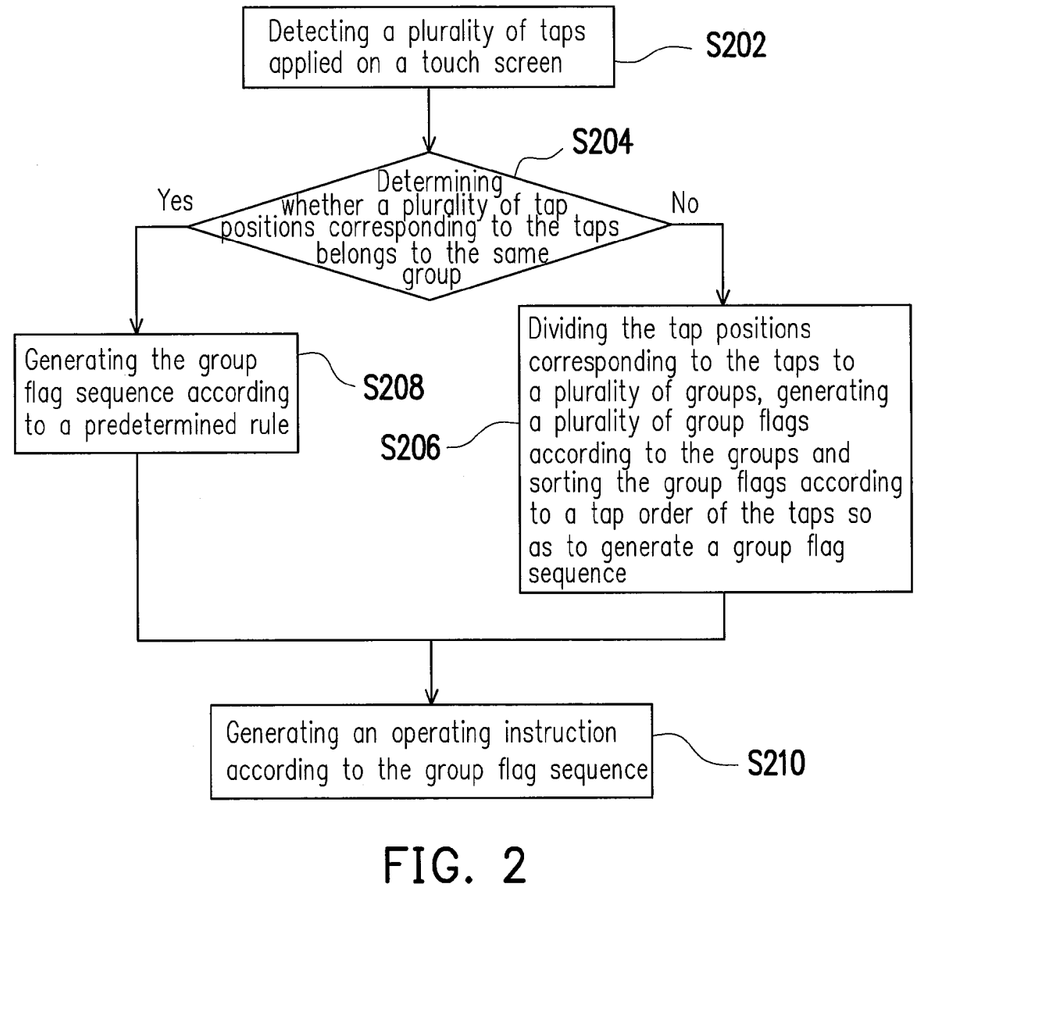
FIG. 2 is a flowchart illustrating a method for inputting instruction according to the first exemplary embodiment of the invention.

FIG. 2 is a flowchart illustrating a method for inputting instruction according to the first exemplary embodiment of the invention. Each step of the method for inputting instruction of the present exemplary embodiment will be described with reference to FIG. 1 and FIG. 2.

Referring to FIG. 1 and FIG. 2, in step S202, a touch screen 11 detects a plurality of taps applied by the user thereon and transforms the detected taps into touch signals which are transmitted to the processing unit 13. It is to be mentioned that in order to avoid a false operation performed by the touch screen 11 unexpectedly due to a faulty touch of the user, only the taps applied by the user on the touch screen 11 is analyzed hereinafter. In other words, if a touch detected by the touch screen 11 is not a tap (for example, a slide or a drag applied by the user on the touch screen 11), the processing unit 13 will not perform a follow-up analysis operation.

For example, in the present exemplary embodiment, the processing unit 13 determines whether a touch signal transmitted by the touch screen 11 is a tap signal. If yes, the processing unit 13 records information related to the detected tap signal in the storage unit 12 for the follow-up analysis operation. If not (for example, the signal is a slide signal generated due to the user sliding or dragging on the touch screen 11), the processing unit 13 does not generate a corresponding operation and continuously waits for the next tap signal. Further, the information related to the tap signal is, for example, a tap position or a tap time. For example, a tap position is recorded in a format corresponding to a coordinate on the touch screen, while a tap time is recorded according to a system time of the portable electronic device 10 when the tap signal is detected. Additionally, the processing unit 13 may also determine whether the touch signal is a tap signal according to a predetermined rule, for example, whether coordinates of a plurality of touch signals are successive.

Then, when a predetermined count of taps (e.g. 3 taps, 4 taps or 5 taps) or a similar trigger condition is reached, in step S204, the processing unit 13 determines whether a plurality of tap positions corresponding to the taps belongs to the same group. For instance, the processing unit 13 determines whether the tap positions belong to the same group according to a distance between each of the tap positions corresponding to the taps. When the processing unit 13 determines that the tap positions corresponding to the taps do not belong to the same group, in step S206, the processing unit 13 divides the tap positions corresponding to the taps to a plurality of groups, generates a plurality of group flags according to the groups and sorts the group flags according to a tap order of the taps so as to generate a group flag sequence.

To be in detail, the processing unit 13 may perform a clustering operation on tap positions corresponding to previously detected taps and generate a plurality of group flags according to an operation result of the clustering operation. Therein, each of the group flags corresponds to a group. For example, in the present exemplary embodiment, the processing unit 13 may perform the clustering operation on the tap positions recorded in the format of coordinates in the storage unit 12 in step S202 by using a K-means clustering algorithm so as to divide the tap positions to a plurality of groups. Taking K=2 for example, after the K-means clustering algorithm is operated, the processing unit 13 may divide the tap positions to two groups. Alternatively, the processing unit 13 may also generate other numbers of groups according to different K values, but the invention is not limited thereto. Further, the processing unit 13 may also perform the clustering operation on the tap positions by using an algorithm that can directly or indirectly achieve the effect of clustering, such as a fuzzy C-means algorithm, a DSMEM algorithm or an expectation maximization (EM) algorithm, but the invention is not limited thereto.

Afterward, the processing unit 13 may obtain a unique group flag of each group according to the predetermined rule and correspondingly generate a plurality of group flags according to the groups that the tap positions are divided to and the group flags of the groups. Taking dividing to two groups for example, the processing unit 13 may set a group flag of a group near the upper part of the touch screen 11 as "A" and set a group flag of a group near the lower part of the touch screen 11 as "B". In other words, the processing unit 13 may substantially determine a group flag for each group according to relative positions among a plurality of groups or according to a region (e.g. the upper half, the lower half, the left half and the right half) of each group on the touch screen 11, wherein the group flag may be implemented in a manner, such as a numeral or a symbol, but the invention is not limited thereto. Specially, in step S206, the number of the group flags generated by the processing unit 13 is equal to the number of the taps detected by the touch screen 11 in step S202.

Then, the processing unit 13 sorts the group flags according to a tap order of the previously detected taps so as to generate a group flag sequence. For example, after obtaining each tap or the group flag corresponding to the tap positions, the processing unit 13 may read a detect time of a tap corresponding to each group flag from the storage unit 12, sort the corresponding group flags according to the detect times of the taps decreasingly or increasingly and generate a group flag sequence.

Afterward, in step S210, the processing unit 13 generates an operating instruction according to the group flag sequence. For example, the processing unit 13 may look up into a table to generate the operating instruction corresponding to the group flag sequence. Further, in step S204, when the processing unit 13 determines that the tap positions corresponding to the taps belong to the same group, the processing unit 13 may generate the group flag sequence according to a predetermined rule. For example, the processing unit 13 may generate a plurality of successive same group flags and configure the same as the group flag sequence. In addition, when the processing unit 13 determines that all the tap positions belong to the same group, the processing unit 13 may directly read the previously stored group flag sequence from the storage unit. Next, step S210 is performed after step S208.

It is to be mentioned that in the present exemplary embodiment, the processing unit 13 may further execute a corresponding predetermined function module according to the operating instruction obtained in step S210. For example, when the touch screen 11 is in a screen lock state and if the user taps on the touch screen 11 by a predetermined tap mode according to an unlock tap mode corresponding to a unlock function module, the processing unit 13 may execute the unlock function module and change the touch screen 11 to a screen unlock state or to execute a function of dialing/receiving telephone calls, receiving/sending emails, receiving/sending messages or activating/deactivating the camera. In other words, the user may tap on the touch screen 11 according to the tap mode corresponding to each predetermined function module, such that the processing unit 13 may execute the predetermined function module corresponding to each tap mode.

Figure 3A:
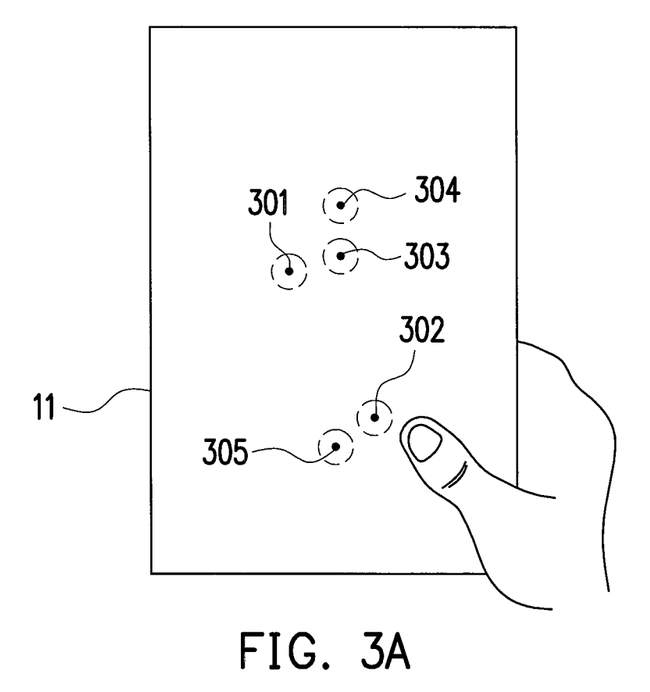
Figure 3B:
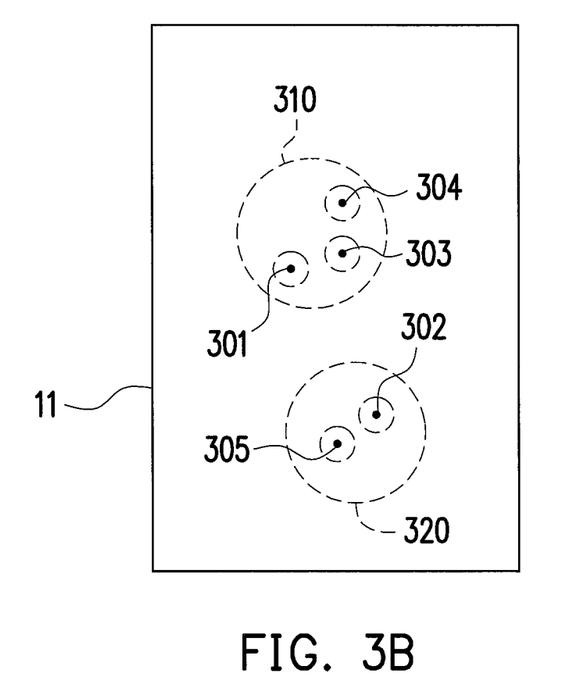
Figure 3C:
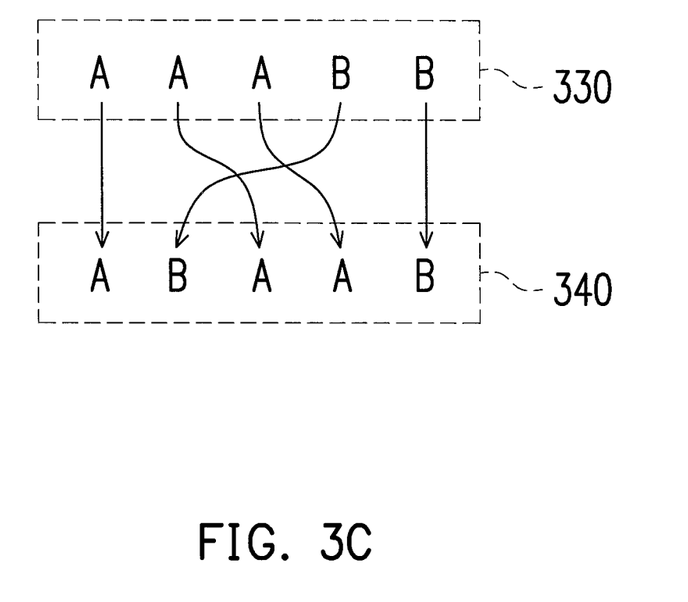

FIG. 3A~FIG. 3C are schematic diagrams of generating a group flag sequence according to the first exemplary embodiment of the invention.

Referring to FIG. 3A, given that the user sequentially taps on tap positions 301~305 of the touch screen 11, and the tap order is sorted increasingly by the tap position 301, the tap position 302, the tap position 303, the tap position 304 and the tap position 305. At this time, the processing unit 13 records the related the tap information (e.g. the information of coordinates and tap times of the tap positions 301~305) in the storage unit.

Continuously referring to FIG. 3B, after the predetermined count of taps is reached, if the tap positions corresponding to the taps are dispersive, the processing unit performs the clustering operation on the tap positions 301~305 so as to divide the tap position 301, the tap position 303 and the tap position 304 as a group 310 and the tap positions 302 and 305 as a group 320. Accordingly, the processing unit 13 may obtain group flag corresponding to the group 310 and the group 320, respectively. For example, the group flag corresponding to the group 310 is "A" while the group flag corresponding to the group 320 is "B".

Then, referring to FIG. 3C, according to the group flag of each of the groups 310 and 320 and the number of tap positions (the total number is 5 composed of tap positions 301~305) in each of the groups 310 and 320, the processing unit 13 generates a plurality of corresponding group flags or a combination 330 of the group flags (e.g. the combination of the 5 group flags is "ABAAB") and according to a tap order corresponding to the tap positions 301~305, sorts the group flags or the combination 330 of the group flags so as to generate a group flag sequence 340 (e.g. "ABAAB"). For instance, the processing unit 13 executes a call module according to the group flag sequence 340 of "ABAAB".

In another exemplary embodiment of the invention, before clustering the tap positions and in order to determine whether the tap positions require to be divided to a plurality of groups, the processing unit 13 calculates a dispersion degree of the tap positions. If the dispersion degree of the tap positions is high, it indicates that the tap positions are adapted to be divided to a plurality of groups, and at this time, the processing unit 13 continues to perform the clustering operation so as to divide the tap positions to a plurality of groups. Otherwise, if the dispersion degree of the tap positions is low, it indicates that the tap positions are concentrated and adapted to be directed divided to the same group, and at this time, the processing unit 13 directly the tap positions to the same group. As such, the speed for generating the group flag sequence may be enhanced and the system resource may be saved effectively.

[Second Exemplary Embodiment]

Figure 4:
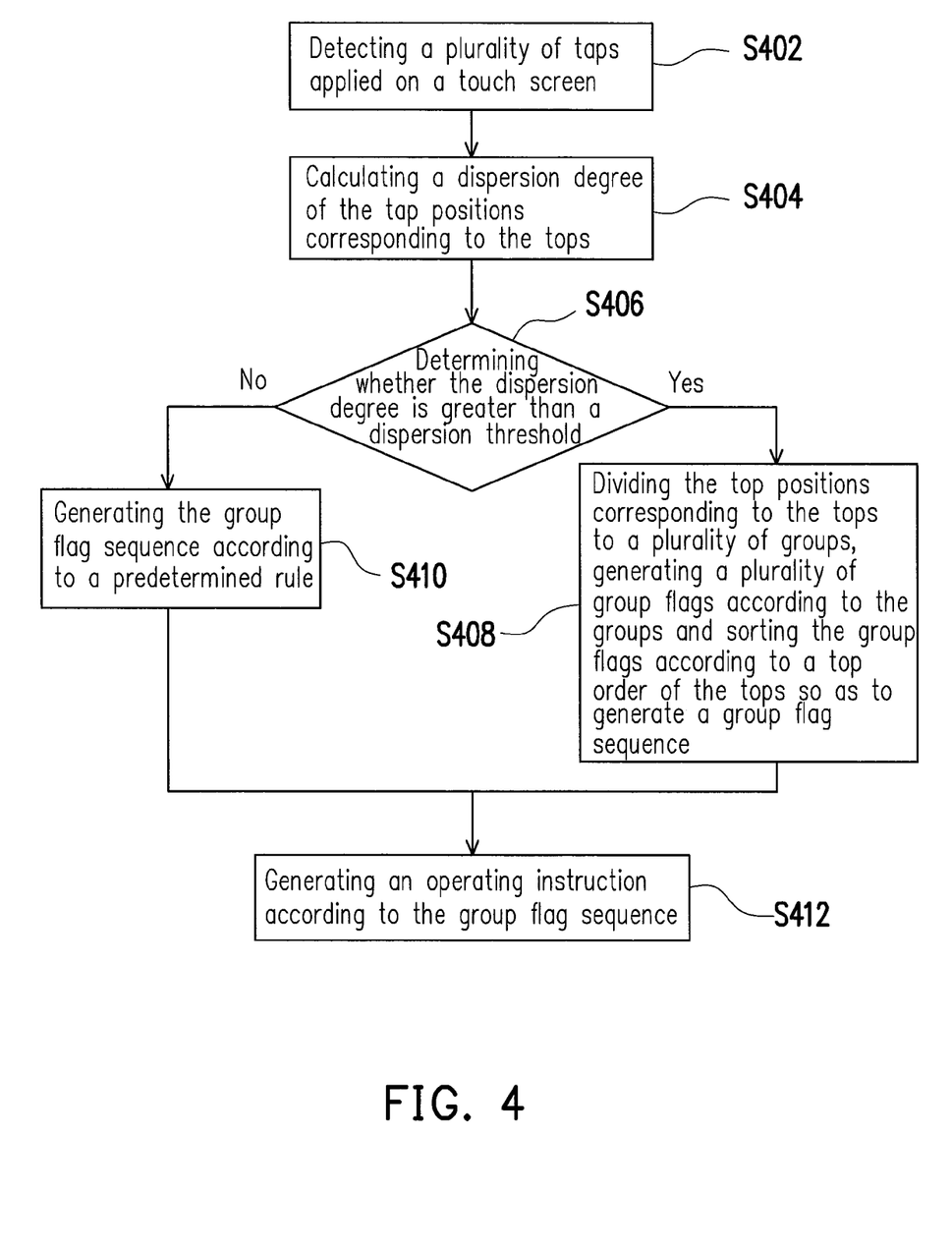
FIG. 4 is a flowchart illustrating a method for inputting instruction according to a second exemplary embodiment of the invention.

FIG. 4 is a flowchart illustrating a method for inputting instruction according to a second exemplary embodiment of the invention. Here, it is to be noticed that the hardware structure of the second exemplary embodiment is similar to the hardware structure of first exemplary embodiment and thus, will not be repeated. The second exemplary embodiment will be described by utilizing the elements illustrated in the first exemplary embodiment hereinafter.

Referring to FIG. 4 with FIG. 1, in step S402, the touch screen 11 detects a plurality of taps applied by the user thereon and the processing unit 13 stores the information related to the taps in the storage unit 12. Then, after a predetermined count of taps is reached, in step S404, the processing unit 13 calculates a dispersion degree or a discrete degree of tap positions corresponding to the taps. For instance, the processing unit 13 may calculate a variance of the tap positions and configure the variance as the dispersion degree or the discrete degree. Taking the tap positions 301~305 depicted in FIG. 3, the processing unit 13 may obtain a centroid position of the tap positions 301~305, calculate a distance from each of the tap positions 301~305 to the centroid position, and then, a square of each distance is further obtained so as to configure an average of the squares of the distances as the variance. However, the invention is not limited thereto, and any algorithm or calculation method that is capable of determining a dispersion degree or a discrete degree among multiple points falls within the scope of the present exemplary embodiment.

Afterward, in step S406, the processing unit 13 determines whether the dispersion degree calculated in step S404 is greater than a dispersion threshold. When the processing unit 13 determines that the dispersion degree is greater than the dispersion threshold, it indicates that the tap positions require to be divided to a plurality of groups, and then the processing unit 13 continues to perform step S408.

In step S408, the processing unit 13 divides the tap positions corresponding to the taps to a plurality of groups, generates a plurality of group flags according to the groups and sorts the group flags according to a tap order of the taps so as to generate a group flag sequence. For instance, the processing unit 13 may perform the clustering operation on the tap positions recorded in the format of coordinates in the storage unit 12 in step S402 by using the K-means clustering algorithm so as to divide the tap positions to the groups. Then, in step S412, the processing unit 13 generates an operating instruction according to the group flag sequence.

Otherwise, when the processing unit 13 determines that the dispersion degree is not greater than the dispersion threshold, in step S410, the processing unit 13 divides the tap positions to the same group and generates the group flag sequence according to a predetermined rule (e.g. "AAAAA" or "BBBBB"). Then, step S412 is performed after step S410.

It is to be mentioned that in the present exemplary embodiment, the dispersion threshold may be stored in the storage unit 12 in advance and adjusted according to actual requirements in practice. Alternatively, the processing unit 13 may also automatically adjust the dispersion threshold according to experiences of previously performing the clustering operation by using a built-in learning mechanism. Afterward, step S414 is performed after step S412, where the processing unit 13 generates an operating instruction according to the group flag sequence.

In an exemplary embodiment of the invention, the processing unit 13 may also determine whether to perform the clustering operation according to a distance between each of the tap positions. Meanwhile, when performing the clustering operation, distance between each of the tap positions is directly configured as the base for clustering.

[Third Exemplary Embodiment]

Figure 5:
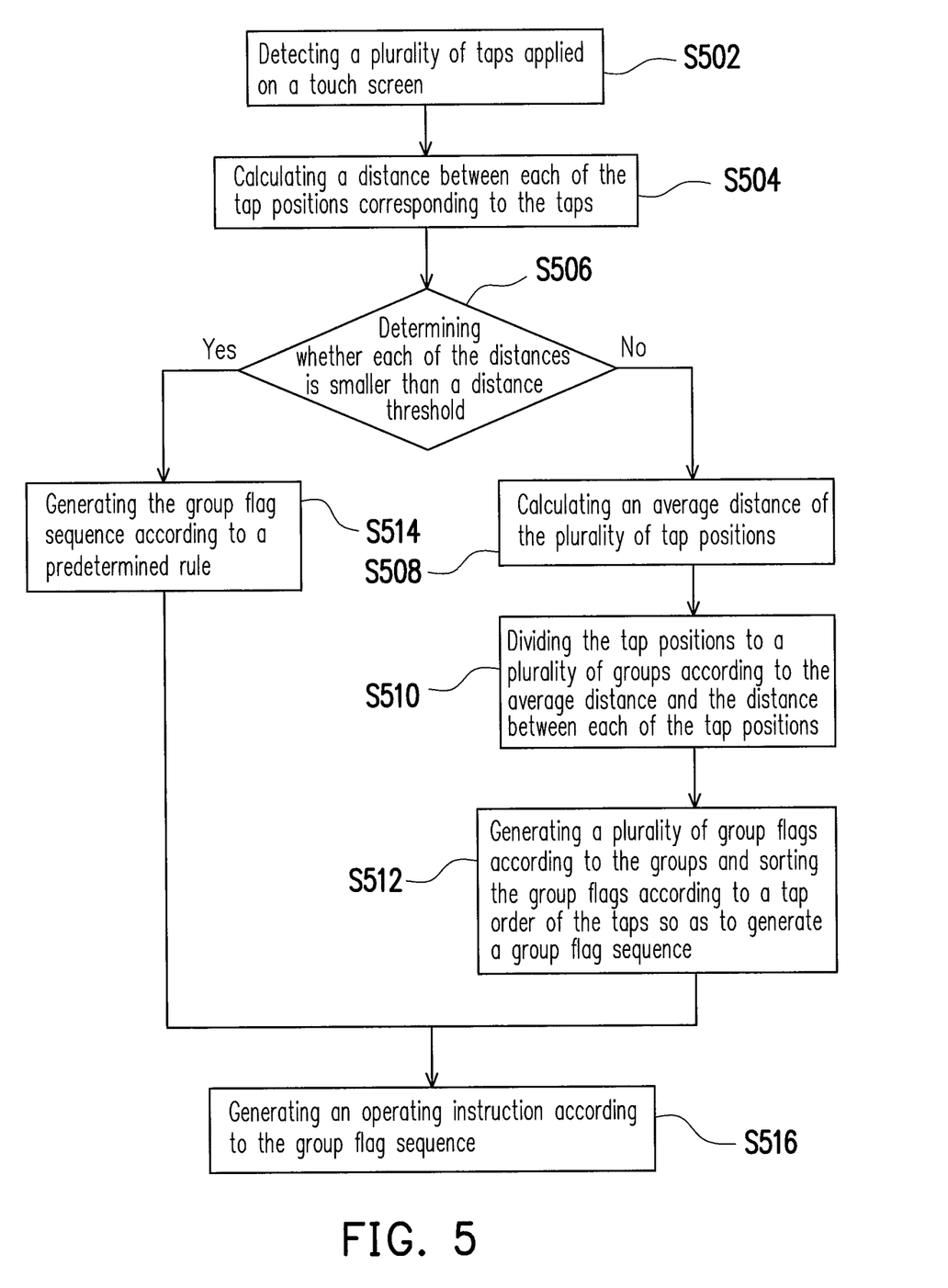
FIG. 5 is a flowchart illustrating a method for inputting instruction according to a third exemplary embodiment of the invention.

FIG. 5 is a flowchart illustrating a method for inputting instruction according to a third exemplary embodiment of the invention. It is to be noticed that the hardware structure of the third exemplary embodiment is similar to the first exemplary embodiment and thus, will not be repeated hereinafter. The third exemplary embodiment will be described by using the elements illustrated in the first exemplary embodiment.

Referring to FIG. 5 with FIG. 1, in step S502, the touch screen 11 detects a plurality of taps applied by the user thereon and the processing unit 13 stores the information related to the taps in the storage unit 12. Then, after a predetermined count of taps is reached, in step S504, the processing unit 13 calculates a distance between each of the tap positions corresponding to the taps.

Afterward, in step S506, the processing unit 13 determines whether the distance between each of the tap positions corresponding to the taps calculated in step S504 is smaller than a distance threshold. When the processing unit 13 determines that not each distance between each of the tap positions is smaller than the distance threshold, it indicates that the tap positions require to be divided to a plurality of groups, and then, step S508 is performed after step S506.

In step S508, the processing unit 13 calculates an average distance of the tap positions. Then, in step S510, the processing unit 13 divides the tap positions to the groups according to the average distance and the distance between each of the tap positions and generates a plurality of group flags. For instance, in the present exemplary embodiment, when a distance between any two of the tap positions is smaller than the average distance, the processing unit 13 immediately divides the two tap positions to the same group. Otherwise, when a distance between any two of the tap positions is not smaller the average distance, the processing unit 13 immediately divides the two tap positions not to the same group. Thereby, even though the complicated clustering operation is not performed, all the tap positions may also be divided to multiple groups rapidly.

Afterward, in step S512, the processing unit 13 generates the group flags according to the groups which the tap positions are divided to and a group flag of each of the groups and sorts the group flags according to a tap order of the taps so as to generate a group flag sequence.

It is to be mentioned that similar to the dispersion threshold illustrated in the preceding exemplary embodiment, the distance threshold as referred to in the present exemplary embodiment may also be stored in the storage unit 12 in advance and adjusted according to actual requirements in practice. Alternatively, the processing unit 13 may also automatically adjust the distance threshold according to experiences of previously performing the clustering operation by using a built-in learning mechanism.

Then, in step S516, the processing unit 13 generates an operating instruction according to the group flag sequence.

Otherwise, when the processing unit 13 determines that each distance is smaller than the distance threshold, in step S514, the processing unit 13 may divide the tap positions to the same group and generate the group flag sequence (e.g. "AAAAA" or "BBBBB") according to a predetermined rule, wherein the group flag sequence may be adjusted according to actual requirements in practice and stored in the storage unit 12 in advance. Then, step S516 is performed after step S514.

In addition to the applicable implementation methods that have been described in the aforementioned exemplary embodiments, the processing unit 13 may also divide a plurality of tap regions on the touch screen by one or more virtual lines in advance and detect tap positions and a tap order corresponding to a plurality of taps applied by the user on the touch screen so as to generate a group flag sequence corresponding to the tap regions by mapping. Thus, an operating instruction may also be generated by the user approximately taping on the touch screen and the amount of computation for performing the clustering operation in the aforementioned exemplary embodiments may be dramatically reduced.

[Fourth Exemplary Embodiment]

Figure 6:
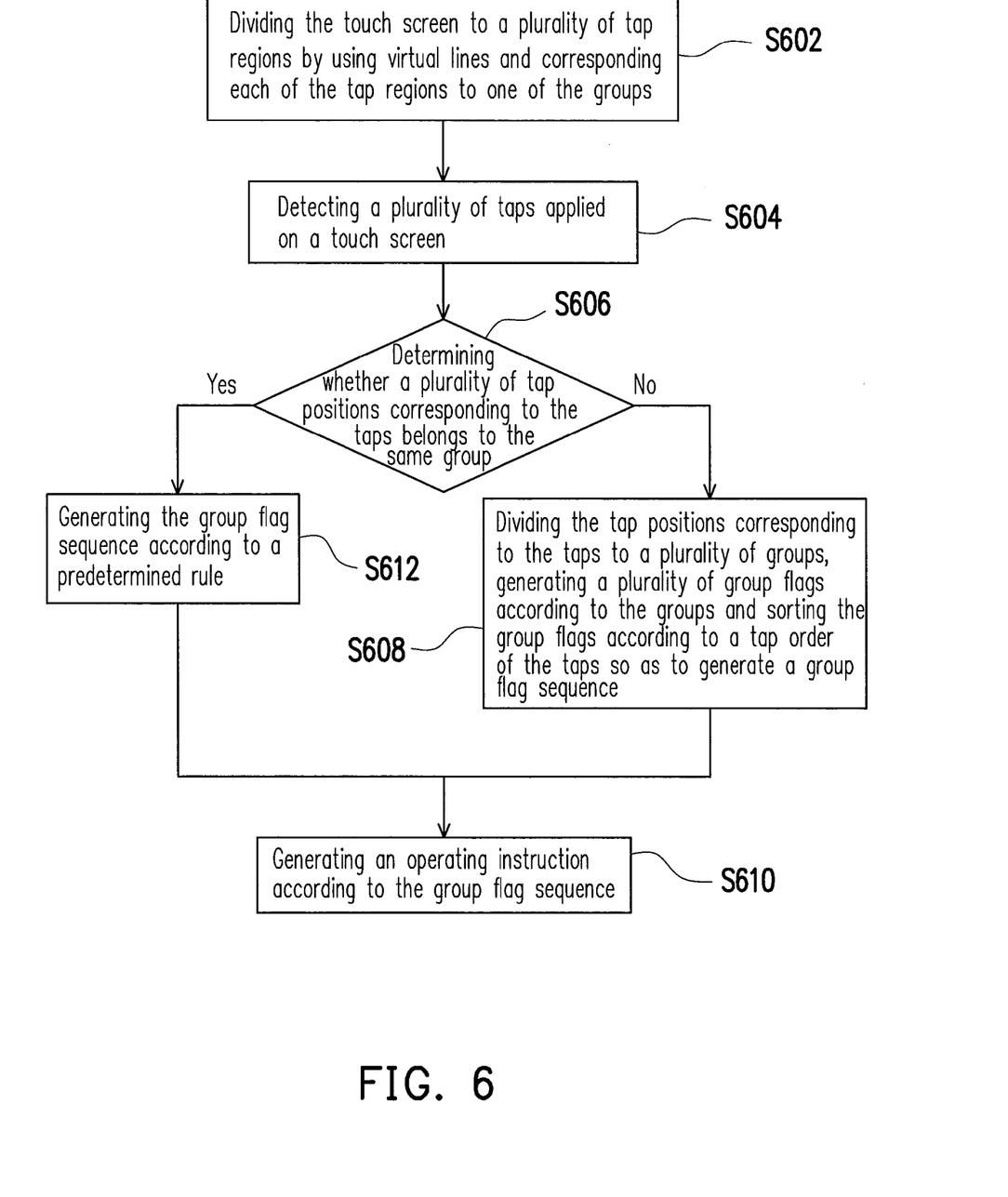
FIG. 6 is a flowchart illustrating a method for inputting instruction according to a fourth exemplary embodiment of the invention.

FIG. 6 is a flowchart illustrating a method for inputting instruction according to a fourth exemplary embodiment of the invention. Here, it is to be noticed that the hardware structure of the fourth exemplary embodiment is similar to the hardware structure of first exemplary embodiment and thus, will not be repeated. The fourth exemplary embodiment will be described by utilizing the elements illustrated in the first exemplary embodiment hereinafter.

Referring to FIG. 6 with FIG. 1, in step S602, the processing unit 13 divides the touch screen 11 to a plurality of tap regions by one or more virtual limes and corresponds each of the tap regions to one of the groups. Specially, the virtual line is visible or invisible (e.g. virtual), but the invention is not limited thereto. Then, in step S604, the touch screen 11 detects a plurality of taps applied by the user on the touch screen 11, and the processing unit 13 stores information related to the taps in the storage unit 12. Afterward, in step S606, the processing unit 13 determines whether a plurality of tap positions corresponding to the taps belongs to the same group. When the processing unit 13 determined that the tap positions corresponding to the taps do not belong to the same group, in step S608, the processing unit 13 divides the tap positions corresponding to the taps to a plurality of groups, generates a plurality of group flags according to the groups and sorts the group flags according to a tap order of the taps so as to generate a group flag sequence. Then in step S610, the processing unit 13 generates an operating instruction according to the group flag sequence.

Otherwise, when the processing unit 13 determines that the tap positions corresponding to the taps belong to the same group, in step S612, the processing unit 13 divides the tap positions to the same group and generates the group flag sequence according to a predetermined rule. Then, step 610 is performed after step S612. Additionally, in the present exemplary embodiment, the processing unit 13 may also perform various types of predetermined function modules according to the generated operating instructions and thus, will not be repeated any longer furthermore.

It is to be mentioned that in step S602, the touch screen 11 is already divided to the plurality of tap regions in advance. Thus, in step S608, the processing unit 13 may directly correspond each of the tap positions to one of the tap regions where it is located so as to generate a plurality of group flags rapidly. In other words, even though the processing unit 13 does not perform the complicated clustering operations, tap positions may be clustered. For example, in another exemplary embodiment, after step S604, the processing unit 13 may directly perform step S608 so as to divide the tap positions to one or more groups by utilizing the aforementioned corresponding method and generate the group flag sequence corresponding the group flags.

Figure 7:
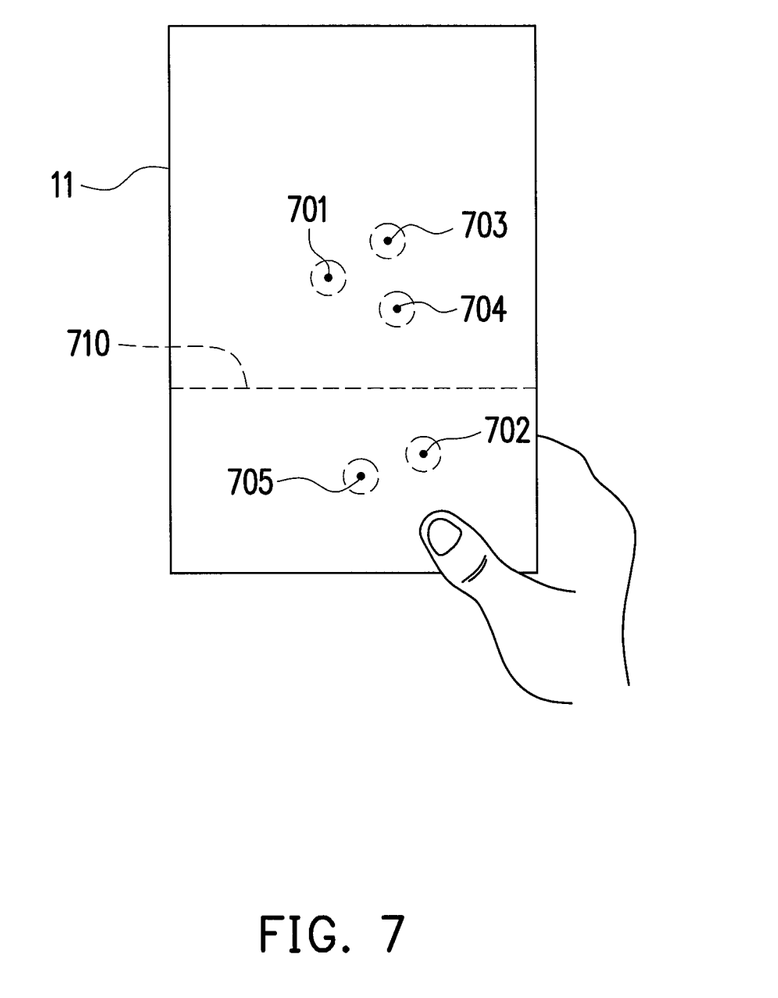
FIG. 7 is a schematic diagram of corresponding tap positions to clock regions in a touch screen and generating group flags according to the fourth exemplary embodiment of the invention.

For instance, FIG. 7 is a schematic diagram of corresponding tap positions to clock regions in a touch screen and generating group flags according to the fourth exemplary embodiment of the invention.

Referring to FIG. 7, a virtual line 710 divides the touch screen 11 to an upper-half tap region and a lower-half tap region. If the user successively applies taps on tap positions 701~705 on the touch screen 11, the processing unit corresponds the tap positions 701~705 to the upper-half tap region and the lower-half tap region respectively so as to correspondingly generate three group flags (e.g. "AAA") of the upper-half tap region and correspondingly generate two group flags (e.g. "BB") of the lower-half tap region.

It is to be mentioned that FIG. 7 is only an exemplary embodiment of implementing the invention, and the invention is not intent to limit the configuration and the number of the virtual lines. For example, taking one virtual line for example, the virtual line may be configured in the center of the touch screen and used to divide the touch screen to an upper and a lower tap regions or a left and a right tap regions, where the configured positions may be fine-tunes according to a length of a finger (e.g. a thumb) of the user. Further, taking two virtual lines for example, the two virtual lines may be configured in a "+" or a "×" manner so as to divide the touch screen to four tap regions (e.g. an upper-left, an upper-right, a lower-left and a lower-right tap regions).

According to another exemplary embodiment of the invention, a computer readable recording medium is provided, whose basic concept is similar to the above exemplary embodiments. The computer readable recording medium may be any type of data storage element capable of storing data. In the exemplary embodiment, the computer readable recording medium stores a plurality of program codes. After the program codes are loaded to the micro-processor unit, the micro-processor unit executes the program codes to perform each step of the methods and the related operation of the above-described exemplary embodiments. The computer readable recording medium may include a read-only memory (ROM), a random-access memory (RAM), a CD-ROM, a cassette, a floppy, an optical storage element and so forth. Further, the micro-processor unit may be an embedded processor or a central processing unit (CPU), but the invention is not limited to the aforementioned implementation methods.

Based on the above, in the method for inputting instruction, the portable electronic device and the computer readable recording medium of the exemplary embodiments of the invention, a plurality of taps applied on a touch screen may be detected, a clustering operation is performed on a plurality of tap positions corresponding to the taps so as to generate a plurality of group flags according to the result of the clustering operation. Additionally, according to an exemplary embodiment, the touch screen may be divided to a plurality of tap regions by using one or more virtual lines to that after the taps are detected, the tap position of each of the taps may correspond to one of the tap regions to generate a plurality of group flags. Further, in an exemplary embodiment of the invention, the group flags may be further sorted according to a tap order of the taps so as to generate a group flag sequence and an operating instruction is generated according to the group flag sequence and perform a corresponding predetermined function module according to the operating instruction. Accordingly, the user may input a corresponding instruction to the portable electronic device by the finger performing simple regional taps without watching the status of the touch screen of the portable electronic device, such that the convenience for inputting the operating instructions can be effectively improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for inputting instruction on a portable electronic device having a touch screen, the method comprising:
   detecting a plurality of taps applied on the touch screen;
   determining whether a plurality of tap positions corresponding to the plurality of taps belongs to a same group according to a distance between each of the tap positions corresponding to the plurality of taps;
   when the plurality of tap positions corresponding to the plurality of taps does not belong to the same group, dividing the plurality of tap positions corresponding to the plurality of taps to a plurality of groups, generating a plurality of group flags corresponding to the plurality of groups and sorting the plurality of group flags to generate a group flag sequence, wherein an order of the plurality of group flags in the group flag sequence corresponds to a tap order of the plurality of taps,
   when the plurality of tap positions corresponding to the plurality of taps belong to the same group, generating the group flag sequence comprising a single group flag; and
   generating an operating instruction according to the group flag sequence.

2. The method for inputting instruction according to claim 1, wherein the step of determining whether the plurality of tap positions corresponding to the plurality of taps belongs to the same group comprises:

calculating a dispersion degree of the plurality of tap positions;

determining whether the dispersion degree is greater than a dispersion threshold;

when the dispersion degree is not greater than the dispersion threshold, identifying the plurality of tap positions as belonging to the same group; and when the dispersion degree is greater than the dispersion threshold, identifying the plurality of tap positions as not belonging to the same group.

3. The method for inputting instruction according to claim 1, wherein the step of dividing the plurality of tap positions corresponding to the plurality of taps to the plurality of groups comprises:

dividing the plurality of tap positions corresponding to the plurality of taps to the plurality of groups by using a K-means clustering algorithm.

4. The method for inputting instruction according to claim 1, wherein the step of determining whether the plurality of tap positions corresponding to the plurality of taps belongs to the same group comprises:

calculating a distance between each of the tap positions;

determining whether the distance between each of the tap positions is smaller than a distance threshold;

when the distance between each of the tap positions is smaller than the distance threshold, identifying the plurality of tap positions as belonging to the same group; and when the distance between each of the tap positions is not smaller than the distance threshold, identifying the plurality of tap positions as not belonging to the same group.

5. The method for inputting instruction according to claim 4, wherein the step of dividing the plurality of tap positions corresponding to the plurality of taps to the plurality of groups comprises:

calculating an average distance of the plurality of tap positions; and dividing the plurality of tap positions to the plurality of groups according to the average distance and the distance between each of the tap positions.

6. The method for inputting instruction according to claim 1, further comprising:

performing a predetermined function module according to the operating instruction.

7. The method for inputting instruction according to claim 1, further comprising:

dividing the touch screen to a plurality of tap regions by using at least one virtual line and corresponding each of the tap regions to one of the groups.

8. A portable electronic device, comprising:

a touch screen, configured to detect a plurality of taps;

a storage unit, configured to store a plurality of tap positions corresponding to the plurality of taps and a tap order of the plurality of taps;

a processing unit, coupled to the touch screen and the storage unit and configured to determine whether the plurality of tap positions corresponding to the plurality of taps belongs to a same group according to a distance between each of the tap positions corresponding to the plurality of taps, wherein when the plurality of tap positions corresponding to the plurality of taps does not belongs to the same group, the processing unit divides the plurality of tap positions corresponding to the plurality of taps to a plurality of groups, generates a plurality of group flags corresponding to the plurality of groups and sorts the plurality of group flags to generate a group flag sequence, wherein an order of the plurality of group flags in the group flag sequence corresponds to a tap order of the plurality of taps, when the plurality of tap positions corresponding to the plurality of taps belongs to the same group, the processing unit generates the group flag sequence comprising a single group flag, and wherein the processing unit generates an operating instruction according to the group flag sequence.

9. The portable electronic device according to claim 8, wherein the processing unit calculates a dispersion degree of the plurality of tap positions and determines whether the dispersion degree is greater than a dispersion threshold, when the dispersion degree is not greater than the dispersion threshold, the processing unit identifies the plurality of tap positions as belonging to the same group, and when the dispersion degree is greater than the dispersion threshold, the processing unit identifies the plurality of tap positions as not belonging to the same group.

10. The portable electronic device according to claim 8, wherein the processing unit divides the plurality of tap positions corresponding to the plurality of taps to the plurality of groups by using a K-means clustering algorithm.

11. The portable electronic device according to claim 8, wherein the processing unit calculates a distance between each of the tap positions and determines whether the distance between each of the tap positions is smaller than a distance threshold, wherein when the distance between each of the tap positions is smaller than the distance threshold, the processing unit identifies the plurality of tap positions as belonging to the same group, and wherein when the distance between each of the tap positions is not smaller than the distance threshold, the processing unit identifies the plurality of tap positions as not belonging to the same group.

12. The portable electronic device according to claim 11, wherein the processing unit further calculates an average distance of the plurality of tap positions and divides the plurality of tap positions to the plurality of groups according to the average distance and the distance between each of the tap positions.

13. The portable electronic device according to claim 8, wherein the processing unit further performs a predetermined function module according to the operating instruction.

14. The portable electronic device according to claim 8, wherein the processing unit further divides the touch screen to a plurality of tap regions by using at least one virtual line and corresponds each of the tap regions to one of the groups.

15. A non-transitory computer readable recording medium, storing a plurality of program codes, wherein when the plurality of program codes is loaded into a micro-processor unit, the micro-processor unit executes the plurality of program codes to perform steps comprising:

detecting a plurality of taps applied on a touch screen;

determining whether a plurality of tap positions corresponding to the plurality of taps belongs to a same group according to a distance between each of the tap positions corresponding to the plurality of taps;

when the plurality of tap positions corresponding to the plurality of taps does not belong to the same group, dividing the plurality of tap positions corresponding to the plurality of taps to a plurality of groups, generating a plurality of group flags corresponding to the plurality of groups and sorting the plurality of group flags so as to generate a group flag sequence, wherein an order of the plurality of group flags in the group flag sequence corresponds to a tap order of the plurality of taps, when the plurality of tap positions corresponding to the plurality of taps belongs to the same group, generating the group flag sequence comprising a single group flag; and generating an operating instruction according to the group flag sequence.

16. The non-transitory computer readable recording medium according to claim 15, wherein the micro-processor unit further executes the plurality of program codes to perform steps comprising:

calculating a dispersion degree of the plurality of tap positions;

determining whether the dispersion degree is greater than a dispersion threshold;

when the dispersion degree is not greater than the dispersion threshold, identifying the plurality of tap positions as belonging to the same group; and when the dispersion degree is greater than the dispersion threshold, identifying the plurality of tap positions as not belonging to the same group.

17. The non-transitory computer readable recording medium according to claim 15, wherein the micro-processor unit further executes the plurality of program codes to perform a step comprising:

dividing the plurality of tap positions corresponding to the plurality of taps to the plurality of groups by using a K-means clustering algorithm.

18. The non-transitory computer readable recording medium according to claim 15, wherein the micro-processor unit further executes the plurality of program codes to perform steps comprising:

calculating a distance between each of the tap positions;

determining whether the distance between each of the tap positions is smaller than a distance threshold;

when the distance between each of the tap positions is smaller than the distance threshold, identifying the plurality of tap positions as belonging to the same group; and when the distance between each of the tap positions is not smaller than the distance threshold, identifying the plurality of tap positions as not belonging to the same group.

19. The non-transitory computer readable recording medium according to claim 18, wherein the micro-processor unit further executes the plurality of program codes to perform steps comprising:

calculating an average distance of the plurality of tap positions; and dividing the plurality of tap positions to the plurality of groups according to the average distance and the distance between each of the tap positions.

20. The non-transitory computer readable recording medium according to claim 15, wherein the micro-processor unit further executes the plurality of program codes to perform a step comprising:

performing a predetermined function module according to the operating instruction.

21. The non-transitory computer readable recording medium according to claim 17, wherein the micro-processor unit further executes the plurality of program codes to perform a step comprising:

dividing the touch screen to a plurality of tap regions by using at least one virtual line and corresponding each of the tap regions to one of the groups.

* * * * *